US012627662B2

(12) United States Patent
Chang

(10) Patent No.: US 12,627,662 B2
(45) Date of Patent: May 12, 2026

(54) NETWORK APPARATUS AND NETWORK AUTHENTICATION METHOD THEREOF

(71) Applicant: Moxa Inc., New Taipei City (TW)

(72) Inventor: Yi Chang, New Taipei City (TW)

(73) Assignee: Moxa Inc., New Taipei City (TW)

( * ) Notice: Subject to any disclaimer, the term of this patent is extended or adjusted under 35 U.S.C. 154(b) by 277 days.

(21) Appl. No.: 18/344,892

(22) Filed: Jun. 30, 2023

(65) Prior Publication Data

US 2025/0007910 A1 Jan. 2, 2025

(51) Int. Cl.
*H04L 9/40* (2022.01)

(52) U.S. Cl.
CPC ........ *H04L 63/0876* (2013.01); *H04L 63/101* (2013.01); *H04L 63/20* (2013.01)

(58) Field of Classification Search
CPC ... H04L 63/0876; H04L 63/101; H04L 63/20; H04L 63/08
See application file for complete search history.

(56) References Cited

U.S. PATENT DOCUMENTS

| | | | |
|---|---|---|---|
| 2002/0166048 A1 | 11/2002 | Coulier | |
| 2007/0022469 A1* | 1/2007 | Cooper | H04L 9/3247 726/3 |

| | | | | |
|---|---|---|---|---|
| 2017/0006038 A1* | 1/2017 | Zhang | | H04L 63/08 |
| 2017/0126641 A1* | 5/2017 | Thomas | | H04L 65/612 |
| 2018/0373887 A1* | 12/2018 | Smith | | G06F 21/6227 |
| 2019/0319923 A1* | 10/2019 | Tu | | H04L 63/0218 |

FOREIGN PATENT DOCUMENTS

| | | |
|---|---|---|
| CN | 107707559 | 2/2018 |
| TW | 200905515 | 2/2009 |
| TW | I515600 | 1/2016 |
| TW | I747093 | 11/2021 |

OTHER PUBLICATIONS

"Search Report of Europe Counterpart Application", issued on Feb. 8, 2024, p. 1-p. 10.

* cited by examiner

*Primary Examiner* — Khoi V Le
(74) *Attorney, Agent, or Firm* — JCIPRNET

(57) ABSTRACT

A network apparatus and a network authentication method thereof are provided. The network apparatus serving as a server end includes a network interface device and a processor. The network interface device is configured to connect to a network. The processor is coupled to the network interface device, and configured to receive a network packet send by a client end through the network, acquire a verification data commonly agreed with the client end, and establish a network connection with the client end in response to a verification data recorded in the network packet matching the acquired verification data.

15 Claims, 8 Drawing Sheets

10

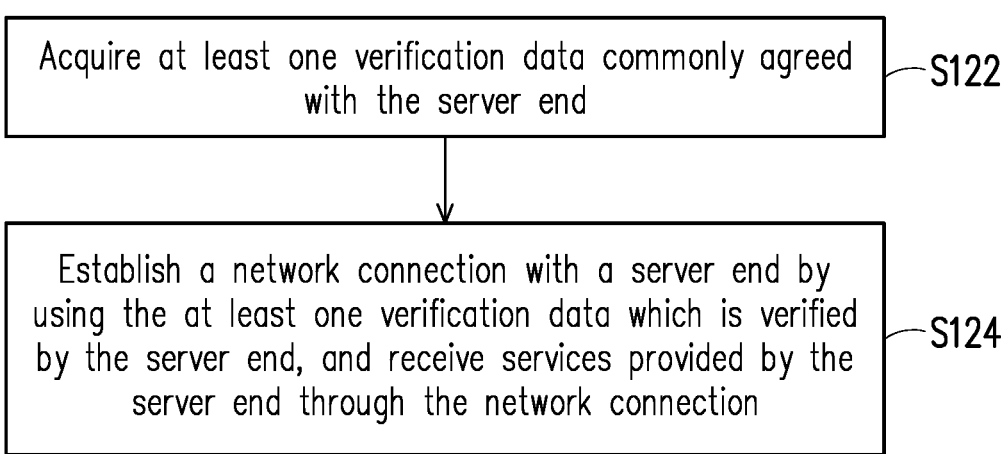

Acquire at least one verification data commonly agreed with the server end ⌐S122

Establish a network connection with a server end by using the at least one verification data which is verified by the server end, and receive services provided by the server end through the network connection ⌐S124

FIG. 1B

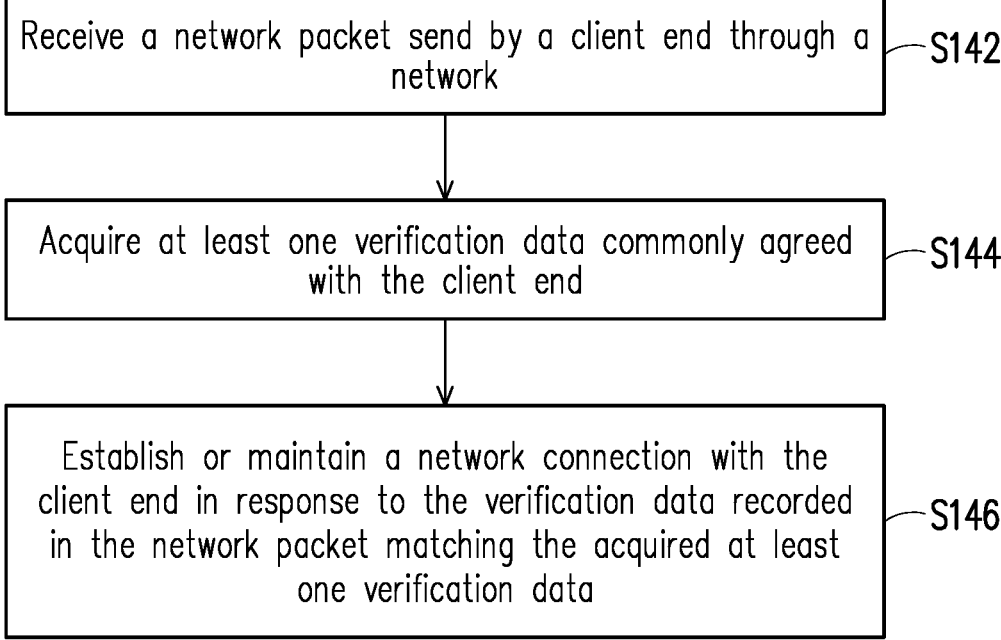

Receive a network packet send by a client end through a network ⌐S142

Acquire at least one verification data commonly agreed with the client end ⌐S144

Establish or maintain a network connection with the client end in response to the verification data recorded in the network packet matching the acquired at least one verification data ⌐S146

FIG. 1C

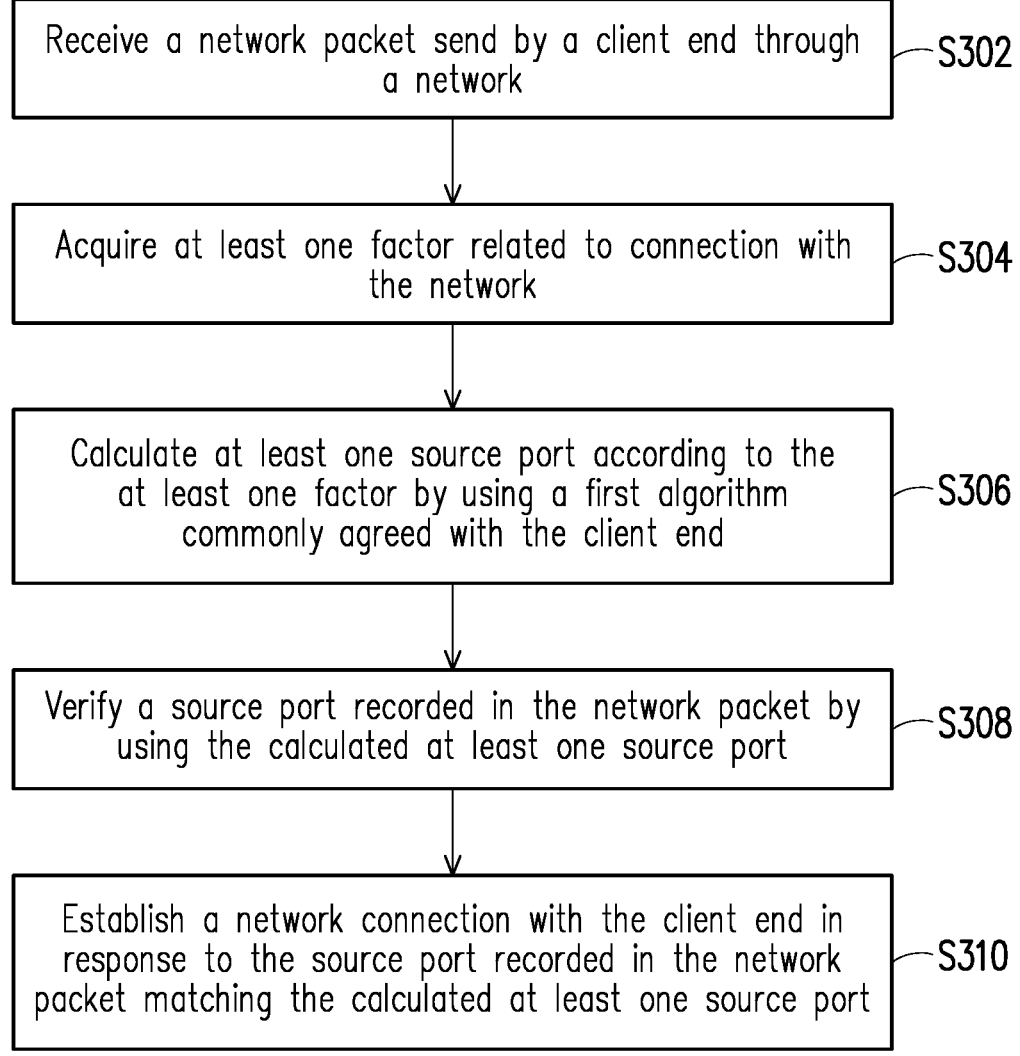

Receive a network packet send by a client end through a network —S302

Acquire at least one factor related to connection with the network —S304

Calculate at least one source port according to the at least one factor by using a first algorithm commonly agreed with the client end —S306

Verify a source port recorded in the network packet by using the calculated at least one source port —S308

Establish a network connection with the client end in response to the source port recorded in the network packet matching the calculated at least one source port —S310

FIG. 3

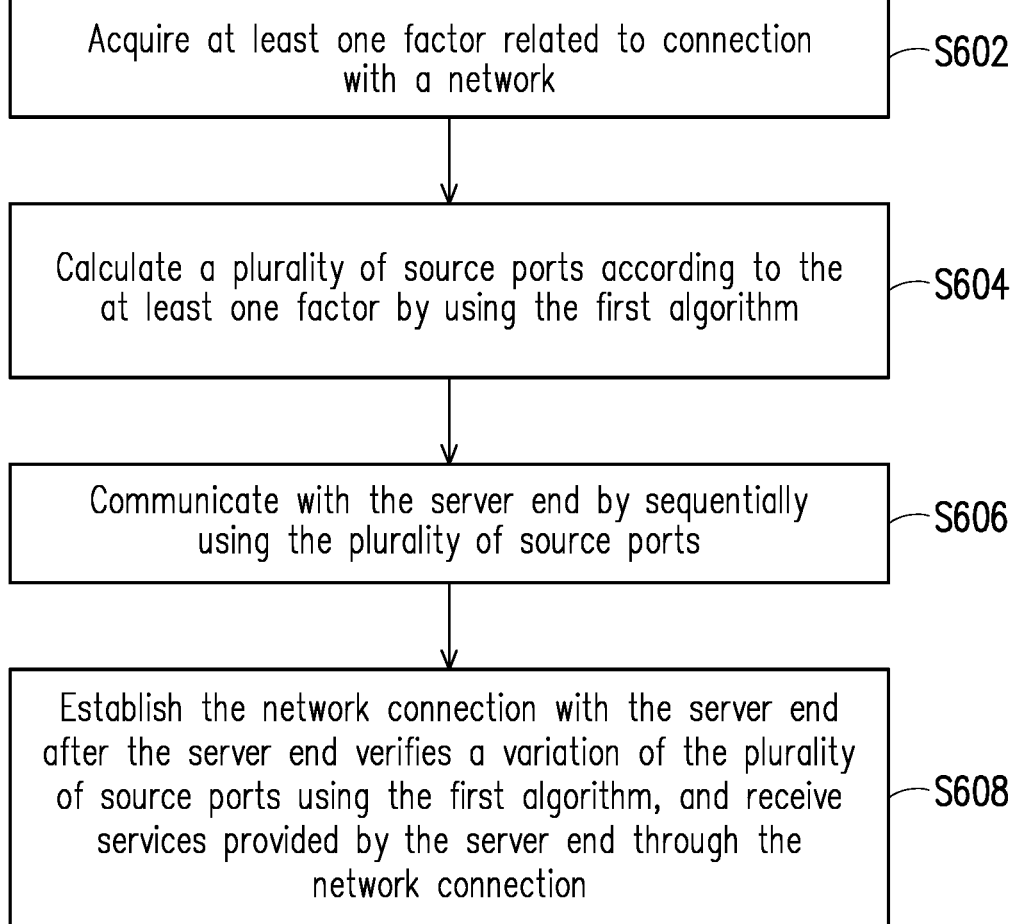

Acquire at least one factor related to connection with a network    S602

Calculate a plurality of source ports according to the at least one factor by using the first algorithm    S604

Communicate with the server end by sequentially using the plurality of source ports    S606

Establish the network connection with the server end after the server end verifies a variation of the plurality of source ports using the first algorithm, and receive services provided by the server end through the network connection    S608

FIG. 6

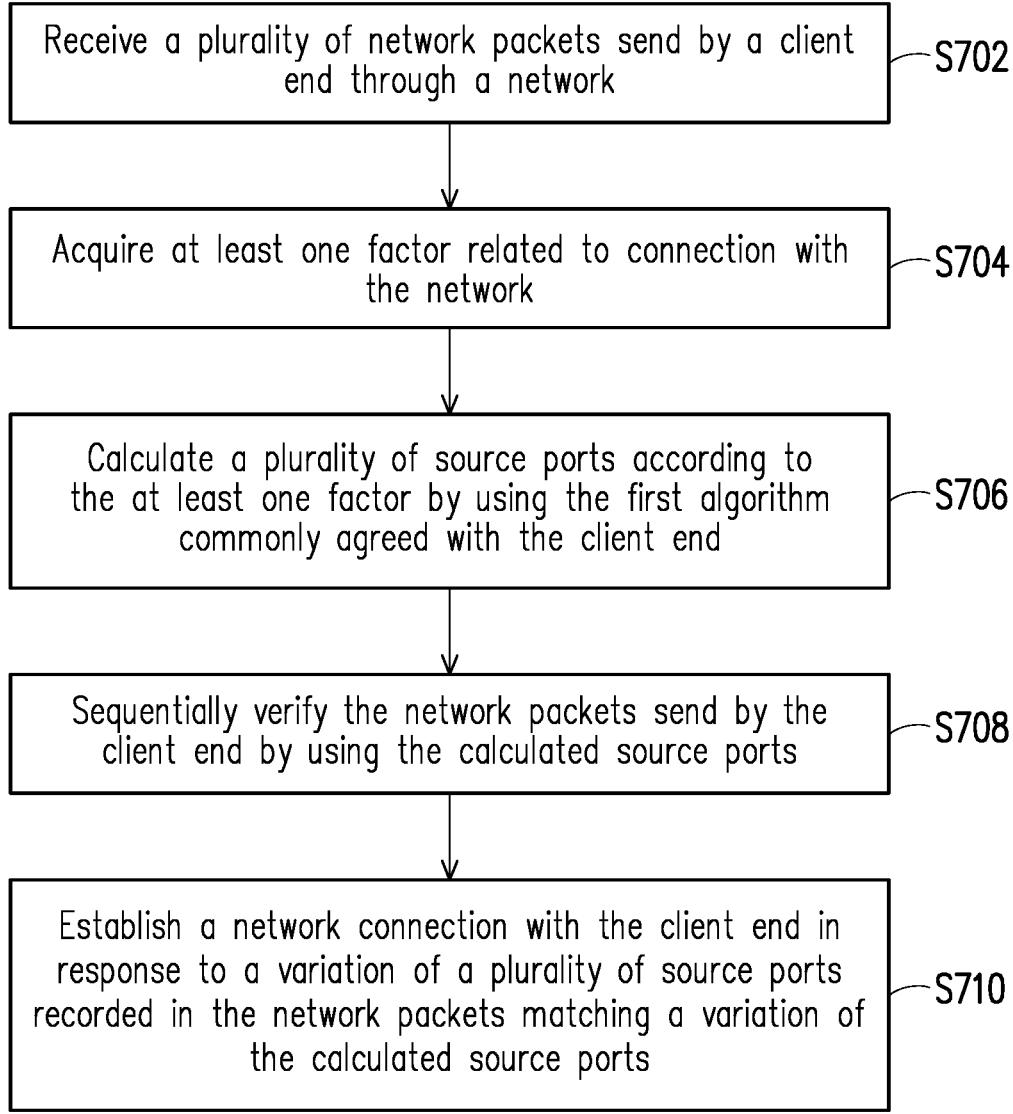

Receive a plurality of network packets send by a client end through a network — S702

Acquire at least one factor related to connection with the network — S704

Calculate a plurality of source ports according to the at least one factor by using the first algorithm commonly agreed with the client end — S706

Sequentially verify the network packets send by the client end by using the calculated source ports — S708

Establish a network connection with the client end in response to a variation of a plurality of source ports recorded in the network packets matching a variation of the calculated source ports — S710

FIG. 7

NETWORK APPARATUS AND NETWORK AUTHENTICATION METHOD THEREOF

BACKGROUND

Technical Field

The disclosure relates to network security, and particularly relates to a network apparatus and a network authentication method thereof.

Description of Related Art

In a conventional network service scheme, when a client end requests for resource access, the server end identifies the client end by verifying certificates during connection establishment or identifies certificates, passwords or tokens after connection establishment. An internet protocol (IP) address of the client end is used as an access control list (ACL) to determine whether the client end is authorized to establish a connection.

However, such kind of verification is rigorous and complicated, and therefore the computing burden on the server end is relatively high. In addition, since the structured data in the certificate may vary depending on the analysis components used, a potential risk may occur during parsing.

SUMMARY

The disclosure provides a network apparatus and a network authentication method thereof capable of improving security of network service.

In an embodiment of the disclosure, a network apparatus serving as a client end is provided. The network apparatus comprises a network interface device and a processor. The network interface device is configured to connect to a network. The processor is coupled to the network interface device, and configured to acquire a verification data commonly agreed with a server end, and establish a network connection with the server end by using the verification data which is verified by the server end, and receive services provided by the server end through the network connection.

According to an embodiment of the disclosure, the processor acquires a plurality of verification data commonly agreed with the server end, communicates with the server end by sequentially using the plurality of verification data, and establishes the network connection with the server end after the server end verifies a variation of the plurality of verification data.

According to an embodiment of the disclosure, the processor acquires at least one factor related to connection with the network, calculates the verification data according to the at least one factor by using a first algorithm commonly agreed with a server end, and establishes the network connection with the server end by using the verification data.

According to an embodiment of the disclosure, the processor negotiates a second algorithm used in a next network connection with the server end and establishes the next network connection with the server end by using at least one verification data calculated by using the second algorithm.

According to an embodiment of the disclosure, the processor negotiates with the server end so as to acquire the verification data, or negotiates at least one second verification data used in a next network connection with the server end and establishes the next network connection with the server end by using the at least one second verification data In an embodiment of the disclosure, a network authentication method adapted for a network apparatus serving as a client end is provided. In the method, at least one verification data commonly agreed with the server end is acquired. A network connection with a server end is established by using the at least one verification data which is verified by the server end, and receiving services provided by the server end through the network connection.

According to an embodiment of the disclosure, the method further comprises acquiring a plurality of verification data, communicating with the server end by sequentially using the plurality of verification data; and establishing the network connection with the server end after the server end verifies a variation of the plurality of verification data using the first algorithm.

According to an embodiment of the disclosure, the step of acquiring at least one verification data commonly agreed with the server end comprises acquiring at least one factor related to connection with the network, and calculating the verification data according to the at least one factor by using a first algorithm commonly agreed with a server end; or negotiating with the server end so as to acquire the verification data.

In an embodiment of the disclosure, a network apparatus serving as a server end is provided. The network apparatus comprises a network interface device and a processor. The network interface device is configured to connect to a network. The processor is coupled to the network interface device, and configured to receive a network packet send by a client end through a network, acquire a verification data commonly agreed with the client end, and establish a network connection with the client end in response to a verification data recorded in the network packet matching the acquired verification data.

According to an embodiment of the disclosure, the processor acquires a plurality of verification data commonly agreed with the client end, sequentially verifies a plurality of network packets send by the client end by using the acquired plurality of verification data, and establishes the network connection with the client end in response to a variation of a plurality of verification data recorded in the plurality of network packets matching a variation of the acquired plurality of verification data.

According to an embodiment of the disclosure, the processor acquires at least one factor related to connection with the network, calculates the verification data according to the at least one factor by using a first algorithm commonly agreed with a client end, verifies a verification data recorded in the network packet by using the calculated verification data, and establishes the network connection with the client end in response to the verification data recorded in the network packet matching the calculated verification data.

According to an embodiment of the disclosure, the processor negotiates a second algorithm used in a next network connection with the client end and establishes the next network connection with the client end in response to a verification data recorded in a next network packet matching the verification data calculated by using the second algorithm.

According to an embodiment of the disclosure, the network apparatus further comprises a storage device configured to store a block list, and the processor further adds an identification information of the client end to the block list in response to the verification data recorded in the network packet not matching the acquired verification data.

According to an embodiment of the disclosure, the processor further determines whether an identification information of the client end which sends the network packet is in the block list, and blocks the client end from establishing the network connection in response to the identification information of the client end being in the block list.

According to an embodiment of the disclosure, the processor negotiates with the client end so as to acquire the verification data, or negotiates at least one second verification data used in a next network connection with the client end and establishing the next network connection with the client end by using the at least one second verification data.

In an embodiment of the disclosure, a network authentication method adapted for a network apparatus serving as a server end is provided. In the method, a network packet send by a client end is received through a network. At least one verification data commonly agreed with the client end is acquired. A network connection with the client end is established in response to the verification data recorded in the network packet matching the acquired at least one verification data.

According to an embodiment of the disclosure, the step of acquiring at least one verification data commonly agreed with the client end comprises acquiring at least one factor related to connection with the network, and calculating the verification data according to the at least one factor by using a first algorithm commonly agreed with a client end; or negotiating with the client end so as to acquire the verification data.

According to an embodiment of the disclosure, the at least one factor comprises one or a combination of a shared key with the client end, time, an IP address of the server end, the client end, or a gateway, a MAC address, a previously used verification data, a destination port, a netmask, and a hop count.

To make the above mentioned more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 1B is a flowchart of a network authentication method according to an embodiment of the disclosure.

FIG. 1C is a flowchart of a network authentication method according to an embodiment of the disclosure.

FIG. 3 is a flowchart of a network authentication method according to an embodiment of the disclosure.

FIG. 6 is a flowchart of a network authentication method according to an embodiment of the disclosure.

FIG. 7 is a flowchart of a network authentication method according to an embodiment of the disclosure.

DESCRIPTION OF THE EMBODIMENTS

Figure 1A:
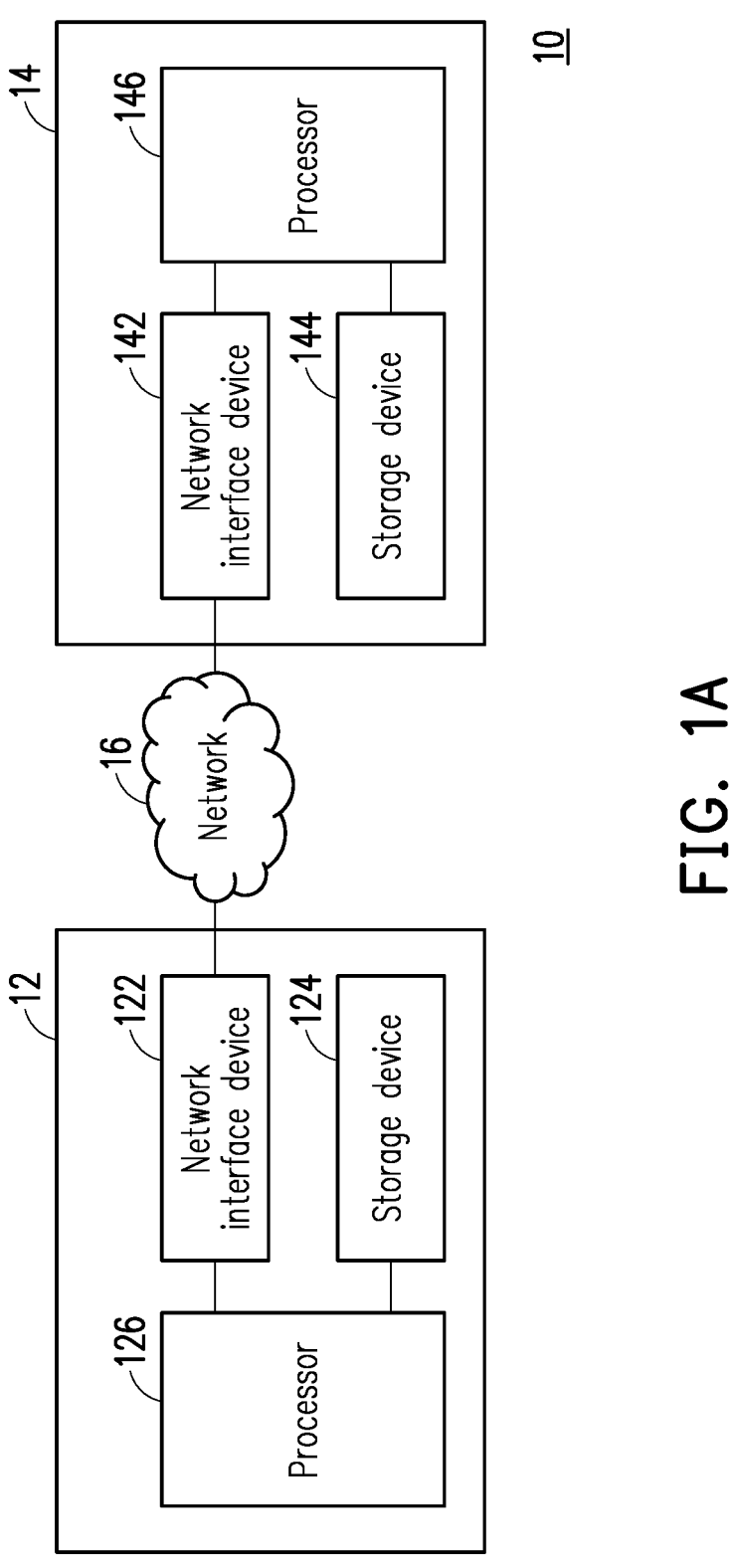
FIG. 1A is a schematic diagram of a network system according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

The present disclosure utilizes the original characteristics of the existing network connection to manipulate the verification data of the network packet as the basis for authentication by using commonly available environmental factors, pre-shared keys or values, pre-exchanged keys or values, and commonly agreed algorithm, so as to exclude illegal connection requests and identify potential attack sources. If the client end can be verified before handshake of the connection, and the manipulated verification data is within a limited range of pure values, the server end does not need to deal with abnormal payload or buffer overflow attacks when making decisions. If the connection is established first, it can also prevent hijack by using the manipulated verification data.

FIG. 1A is a schematic diagram of a network system according to an embodiment of the disclosure. With reference to FIG. 1A, a network system 10 of the present embodiment includes a network apparatus 12 serving as a client end such as a source end and a network apparatus 14 serving as a server end such as a destination end. The network apparatus 12 is, for example, a smart phone, a tablet computer, a personal computer, or any other electronic device that can connect to a network 16. The network apparatus 14 is, for example, a server of various types, a workstation, a router, a gateway, a host computer, an Internet of things (IoT) device, or any other electronic device that can connect to the network 16. The types of the network apparatuses 12 and 14 are not limited in the present embodiments. In some embodiments, the network apparatuses 12 and 14 may be the same type devices.

The network apparatus 12 includes a network interface device 122, a storage device 124, and a processor 126 while the network apparatus 14 includes a network interface device 142, a storage device 144 and a processor 146.

The network interface device 122 and the network interface device 142 are, for example, network cards that support wired network connections such as Ethernet, wireless network cards that support wireless communication standards such as Institute of Electrical and Electronics Engineers (IEEE) 802.11n/b/g/ac/ax/be, or any network cards that support satellite communication, fiber-optic communication or virtual networking structure, but the embodiment is not limited thereto. The network interface device 122 and the network interface device 142 are configured to connect to the network 16. In some embodiments, the network 16 may be distributed network architecture, for example, peer-to-peer networks.

The storage device 124 and the storage device 144 are, for example, any type of fixed or removable random access memory (RAM), read-only memory (ROM), flash memory, hard drive or similar element or a combination thereof. The storage device 124 and the storage device 144 store, for example, computer programs executable by the processor 126 and the processor 146, respectively. In this embodiment, the storage device 146 further stores a block list which records identification information of external devices that have been identified as using illegal verification data.

The processor 126 and the processor 146 are, for example, central processing unit (CPU) or graphics processing unit (GPU), or any other programmable general-purpose or special-purpose microprocessor, a digital signal processor (DSP), a programmable controller, an application specific integrated circuit (ASIC), a programmable logic device (PLD), or other similar device or a combination thereof. In this embodiment, the processor 126 and the processor 146 may respectively execute the computer programs stored in the storage device 124 and the storage device 144 to perform the network authentication method of the embodiments of the disclosure.

FIG. 1B is a flowchart of a network authentication method according to an embodiment of the disclosure. With reference to FIG. 1A and FIG. 1B together, the method of this embodiment is applicable to the network device 12 of FIG. 1A. Detailed steps of the network authentication method of exemplary embodiments of the disclosure accompanied with the elements in the network apparatus 12 will now be described below.

In step S122, the processor 126 of the network apparatus 12 acquires at least one verification data commonly agreed with the server end. The verification data is, for example, a source port, a destination port, a variation of meta data in header of the received network packet transmitted through TCP/IP or other network communication protocols, which is not limited herein. The IP header may include one or a combination of a version, an Internet header length, a type of service, a total length, an identification, flags, a fragment offset, a time to live, a protocol number, a header checksum, a source address, a destination address, options, or a padding, and the TCP header may include one or a combination of a source port, a destination port, a sequence number, an acknowledge number, a data offset, reserved code bits, a window size, a checksum, an urgent point, option, or a padding, which is not limited herein. The verification data is commonly agreed by the client end and the server end. For example, it may be set at the factory. Or, it may be commonly agreed when the server end and the client end are connected to each other first time.

In step S124, the processor 126 establishes a network connection with a server end (i.e. network apparatus 14) by using the at least one verification data which is verified by the server end, and receiving services provided by the server end through the network connection.

In some embodiments, the processor 126 acquires a plurality of verification data commonly agreed with the server end, communicates with the server end by sequentially using the plurality of verification data, and establishes the network connection with the server end after the server end verifies a variation of the plurality of verification data.

In some embodiments, the processor 126 acquires at least one factor related to connection with the network, calculates the verification data according to the at least one factor by using a first algorithm commonly agreed with a server end, and establishes the network connection with the server end by using the verification data. The at least one factor comprises one or a combination of a shared key with the server end, time, an internet protocol (IP) address of the server end, the client end, or a gateway, a media access control (MAC) address, a previously used source port, a destination port, a netmask, and a hop count.

FIG. 1C is a flowchart of a network authentication method according to an embodiment of the disclosure. With reference to FIG. 1A and FIG. 1C together, the method of this embodiment is applicable to the network device 14 of FIG. 1A. Detailed steps of the network authentication method of exemplary embodiments of the disclosure accompanied with the elements in the network apparatus 14 will now be described below.

In step S142, the processor 146 of the network apparatus 14 receives a network packet send by a client end (i.e. the network apparatus 12) through the network 16 by using the network interface device 142.

In step S144, the processor 146 acquires at least one verification data commonly agreed with the client end.

In step S146, the processor 146 establishes or maintains a network connection with the client end in response to the verification data recorded in the network packet matching the acquired verification data. On the contrary, if the verification data recorded in the network packet does not match the acquired verification data, the processor 146 would not establish the network connection. If the network connection has been established before the step S146, the processor 146 disconnects the client end.

In some embodiments, the processor 146 acquires a plurality of verification data commonly agreed with the client end, sequentially verifies a plurality of network packets sent by the client end by using the acquired plurality of verification data, and establishes the network connection with the client end in response to a variation of the plurality of verification data recorded in the plurality of network packets matching a variation of the acquired plurality of verification data.

In some embodiments, the processor 146 acquires at least one factor related to connection with the network, calculates the verification data according to the at least one factor by using a first algorithm commonly agreed with a client end, verifies a verification data recorded in the network packet by using the calculated verification data, and establishes the network connection with the client end in response to the verification data recorded in the network packet matching the calculated verification data.

Figure 2:
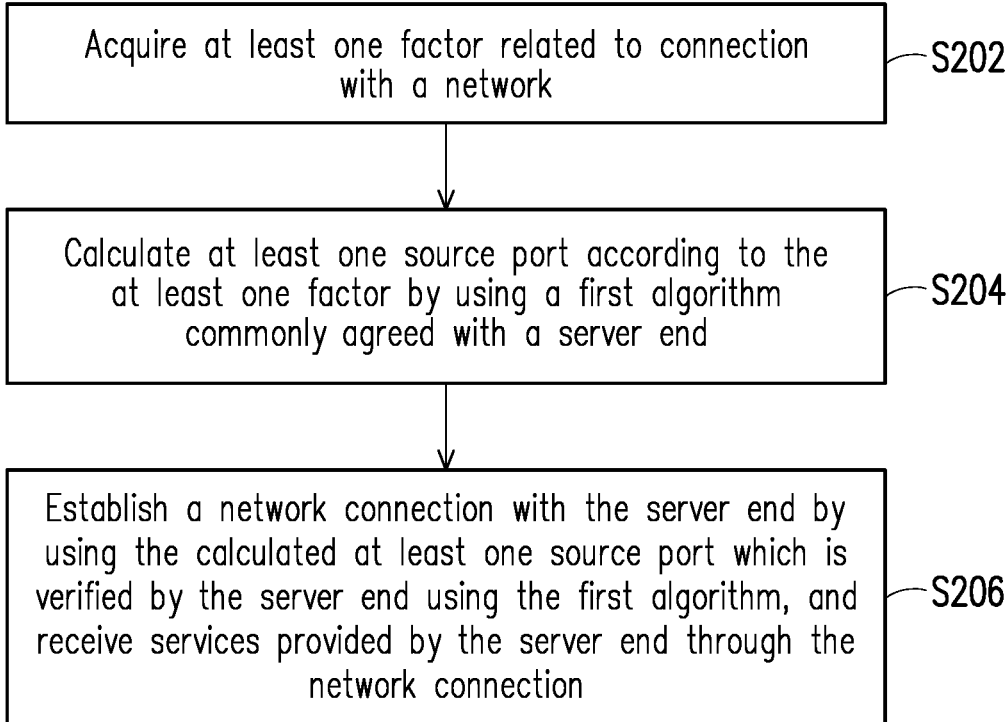
FIG. 2 is a flowchart of a network authentication method according to an embodiment of the disclosure.

FIG. 2 is a flowchart of a network authentication method according to an embodiment of the disclosure. With reference to FIG. 1A and FIG. 2 together, the method of this embodiment is applicable to the network device 12 of FIG. 1A. Detailed steps of the network authentication method of exemplary embodiments of the disclosure accompanied with the elements in the network apparatus 12 will now be described below.

In step S202, the processor 126 of the network apparatus 12 acquires at least one factor related to connection with the network 16. The at least one factor is, for example, one or a combination of a shared key with the server end, time, an internet protocol (IP) address of the server end, the client end, or a gateway, a media access control (MAC) address, a previously used source port, a destination port, a netmask, and a hop count, but the embodiment is not limited thereto.

In step S204, the processor 126 calculates at least one verification data according to the at least one factor by using a first algorithm commonly agreed with a server end (i.e. network apparatus 14). The first algorithm is a symmetric algorithm or an asymmetric algorithm and may include one or a combination of addition, subtraction, multiplication, modulo, or any other mathematical or logical operation, the embodiment is not limited thereto.

In step S206, the processor 126 establishes a network connection with the server end by using the calculated at least one verification data which is verified by the server end using the first algorithm, and receive services provided by the server end through the network connection.

In response to receiving the network packet from the network apparatus 12, the server end may also acquire the factor related to connection with the network 16, and calculate at least one verification data according to the factor by using the first algorithm, so as to verify whether the at least one verification data in the received network packet matches the at least one verification data calculated thereby.

In some embodiments, the processor 126 negotiates a second algorithm used in a next network connection with the server end and establishes the next network connection with the server end by using at least one verification data calculated by using the second algorithm.

In some embodiments, the processor 126 negotiates at least one second verification data used in a next network connection with the server end and establishes the next network connection with the server end by using the at least one second verification data.

In some embodiments, the processor 126 negotiates with the server end so as to acquire the verification data.

In detail, FIG. 3 is a flowchart of a network authentication method according to an embodiment of the disclosure. With reference to FIG. 1A and FIG. 3 together, the method of this embodiment is applicable to the network device 14 of FIG. 1A. Detailed steps of the network authentication method of exemplary embodiments of the disclosure accompanied with the elements in the network apparatus 14 will now be described below.

In step S302, the processor 146 of the network apparatus 14 receives a network packet sent by the client end (i.e. the network apparatus 12) through the network 16 by using the network interface device 142.

In step S304, the processor 146 acquires at least one factor related to connection with the network 16. The at least one factor is, for example, one or a combination of a shared key with the client end, time, an IP address of the server end, the client end, or a gateway, a MAC address, a previously used source port, a destination port, a netmask, and a hop count, but the embodiment is not limited thereto.

In step S306, the processor 146 calculates at least one verification data according to the at least one factor by using a first algorithm commonly agreed with the client end. The factor acquired and the first algorithm used by the processor 146 may be the same as or similar to those used by the processor 126 as described above.

In step S308, the processor 146 verifies a verification data recorded in the network packet by using the calculated at least one verification data.

In step S310, the processor 146 establishes a network connection with the client end in response to the verification data recorded in the network packet matching the calculated at least one verification data.

In some embodiments, during the network connection with the client end, the processor 146 negotiates a second algorithm and/or factors used in a next network connection with the client end, so as to establish the next network connection with the client end in response to a verification data recorded in a next network packet matching the verification data calculated by using the second algorithm. In some embodiments, the server end can negotiate or configure different algorithms and factors for different client ends, so as to increase variability and make it difficult to predict. In some embodiments, the processor 146 negotiates at least one second verification data used in a next network connection with the client end and establishes the next network connection with the client end by using the at least one second verification data.

In some embodiments, instead of calculating the verification data, the processor 146 negotiates with the client end so as to acquire the verification data directly. Similarly, the processor 126 may establish the next network connection via the verification data calculated by the second algorithm or via a second verification data from negotiation.

Based on the above, for the controllable device to device (peer) and client end/server end, the present method can improve the security of network communication with limited resources, and spread the identification information in the transmission stage of each packet. Even if the attacker uses a port scan tool to scan service port of the network apparatus, the attacker cannot predict the correct verification data every time and can be easily identified from the illegal verification data used thereby.

Figure 4A:
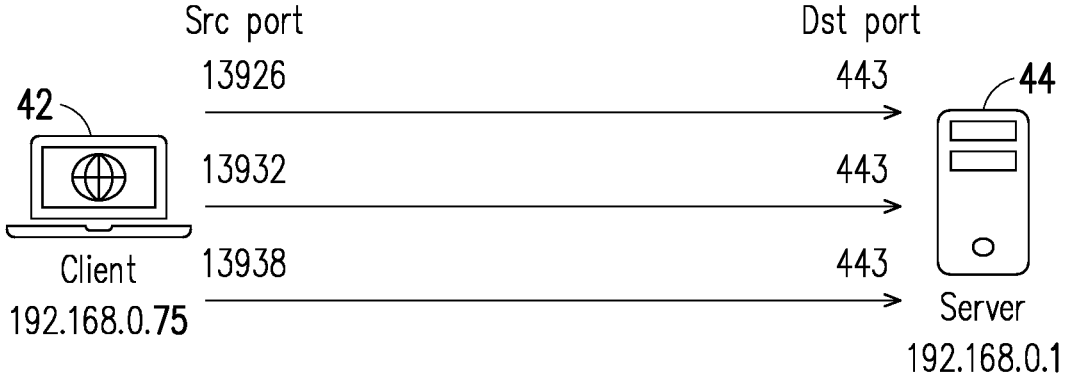
FIG. 4A and FIG. 4B illustrate examples of a network authentication method according to an embodiment of the disclosure.
Figure 4B:
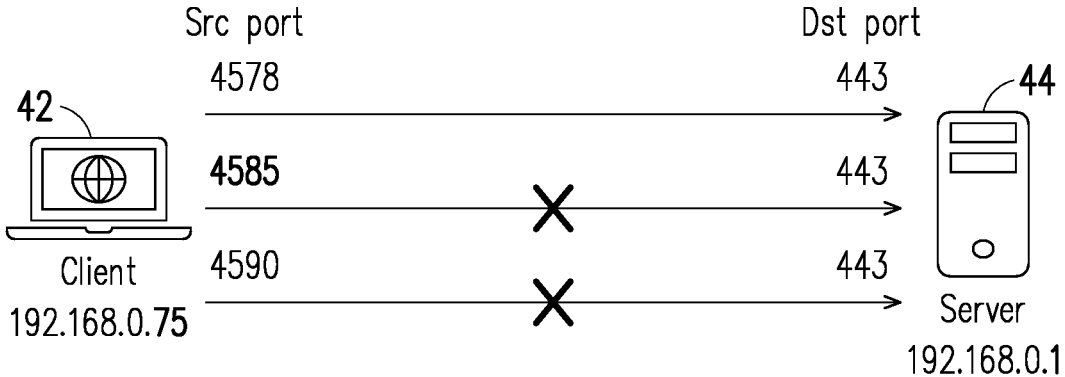

FIG. 4A and FIG. 4B illustrate examples of a network authentication method according to an embodiment of the disclosure. With reference to FIG. 4A, the factors adopted in the present embodiments are the suffixes of the source IP address of a client 42 and the destination IP address of a server 44, and the algorithm is developed to calculate a sum of the suffix values of the source IP address and the destination IP address and take the remainder of 10 as the multiple of legal source port. In FIG. 4A, a sum of the suffix values of the source IP address (192.168.0.75) and the destination IP address (192.168.0.1) is 76, and its remainder of 10 is 6. Therefore, the client 42 needs to use a source port that is a multiple of 6 for connection. For example, the source port with values (Src port) 13926, 13932 and 13938 are all multiples of 6 and therefore regarded as legal source port.

With reference to FIG. 4B, if the client 42 sends a network packet with a source port that is not a multiple of 6 for communication (e.g. 4585, which is not a multiple of 6), the network packet/connection will be rejected, and the identification information of the client 42 will be recorded as illegal connection source in a block list.

It is noted, even if the client 42 sends a network packet with a source port having a correct value (e.g. 4590, which is a multiple of 6) later, the network packet/connection will still be rejected according to the block list. In some embodiments, the block list can be further configured to provide a delayed response or an alternative service for the client using illegal source port before instead of rejecting all the network packets/connections from the client.

Figure 5:
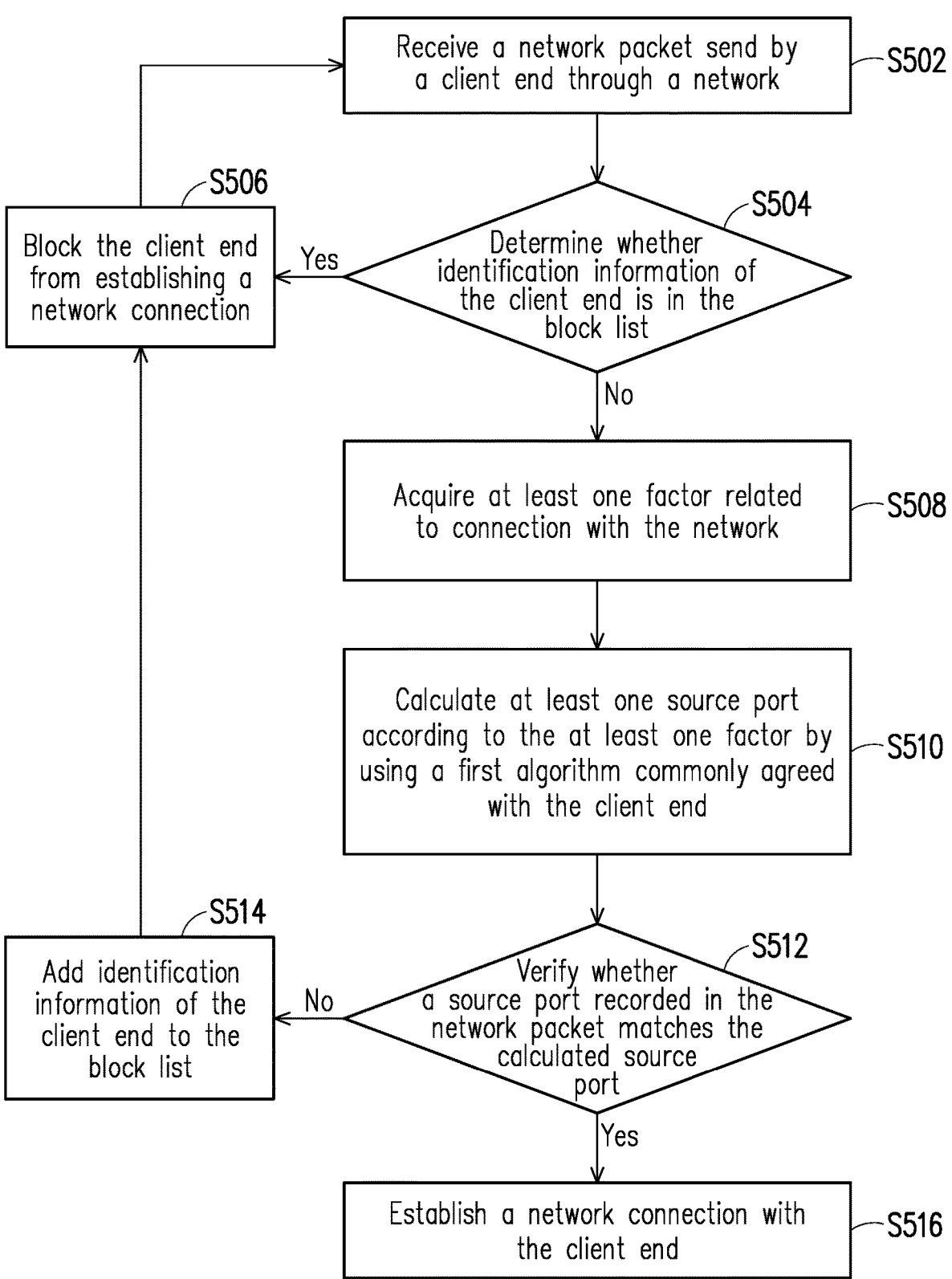
FIG. 5 is a flowchart of a network authentication method according to an embodiment of the disclosure.

In detail, FIG. 5 is a flowchart of a network authentication method according to an embodiment of the disclosure. With reference to FIG. 1A and FIG. 5 together, the method of this embodiment is applicable to the network device 14 of FIG. 1A. Detailed steps of the network authentication method of exemplary embodiments of the disclosure accompanied with the elements in the network apparatus 14 will now be described below.

In step S502, the processor 146 of the network apparatus 14 receives a network packet send by the client end (i.e. the network apparatus 12) through the network 16 by using the network interface device 142.

In step S504, the processor 146 determines whether identification information of the client end is in the block list stored in the storage device 144. The identification information of the client end is, for example, one or a combination of an IP address, a MAC address, a universally unique identifier (UUID), but the embodiment is not limited thereto.

If the identification information of the client end is in the block list, then in step S506, the processor 146 blocks the client end from establishing a network connection, and returns back to step S502 to receive a next network packet.

If the identification information of the client end is not in the block list, then in step S508, the processor 146 acquires at least one factor related to connection with the network 16.

In step S510, the processor 146 calculates at least one verification data according to the at least one factor by using a first algorithm commonly agreed with the client end.

In step S512, the processor 146 verifies whether a verification data recorded in the network packet matches the calculated verification data. The factor acquired and the first algorithm used by the processor 146 are the same as or similar to those used by the processor 126 as described above.

If the verification data recorded in the network packet does not match the calculated verification data, in step S514, the processor 146 adds identification information of the client end to the block list stored in the storage device 144, and then in step S506, blocks the client end from establishing a network connection, and returns back to step S502 to receive a next network packet.

If the verification data recorded in the network packet matches the calculated verification data, then in step S516, the processor 146 establishes a network connection with the client end.

In practical application, a more rigorous algorithm may be used to limit the range of the legal verification data. In extreme cases, there is only one verification data at a time. In some embodiments, the verification data used last time will be used as a factor for selecting the verification data for a next connection. If time is used as the factor in the algorithm, the selected verification data is only valid within a certain time period.

In some embodiments, in the process of identifying the verification data of the network packet, the processor 146 does not need to process connection tracking on the network apparatus 14, and directly implements the verifying process in prerouting with raw table in the netfilter process. As such, resources consumed by performing connection tracking can be saved, and the only required resource is to record the illegal connection sources in the network domain. Taking an IPv4 class C network environment with netmask 255.255.255.0 as an example, only 254 record spaces are required to identify the illegal connection sources in the network environment by IP addresses.

In some embodiments, the processor 146 blocks all network packets with illegal verification data before defensing denial-of-service (DOS) attack, and therefore the burden of computing for defensing DOS attack can be greatly reduced.

Based on the above, since the verification data number is limited meta information in the network packet, through inspection on the verification data, the present method can effectively avoid buffer overflow and other injection attacks, so as to reduce the risk of data processing on verifying the verification data and increase attack difficulty.

In some embodiments, the server end can verify the identity of the client end according to a variation of verification data used in the network packets sequentially sent by the client end. The variation of verification data may be derived from sequentially established connections or sequentially received network packets, in which the connection and the network packets belong to portions of different layers. To be specific, each of the connections may be composed of multiple network packets and each of the network packets includes metadata in the header such that the verification may be executed in the beginning of each connection or in the reception of each network packet, which is not limited herein.

In detail, FIG. 6 is a flowchart of a network authentication method according to an embodiment of the disclosure. With reference to FIG. 1A and FIG. 6 together, the method of this embodiment is applicable to the network device 12 of FIG. 1A. Detailed steps of the network authentication method of exemplary embodiments of the disclosure accompanied with the elements in the network apparatus 12 will now be described below.

In step S602, the processor 126 of the network apparatus 12 acquires at least one factor related to connection with the network 16.

In step S604, the processor 126 calculates a plurality of verification data according to the at least one factor by using a first algorithm commonly agreed with a server end (i.e. network apparatus 14). The first algorithm is a symmetric algorithm or an asymmetric algorithm and may include one or a combination of addition, subtraction, multiplication, modulo, or any other mathematical or logical operation, the embodiment is not limited thereto.

In step S606, the processor 126 communicates with the server end by sequentially using the plurality of verification data. That is, the processor 126 sequentially sends a plurality of network packets respectively with the calculated verification data.

In step S608, the processor 126 establishes the network connection with the server end after the server end verifies a variation of the plurality of verification data using the first algorithm, and receives services provided by the server end through the network connection. In response to receiving the network packet from the network apparatus 12, the server end may also acquire the factor related to connection with the network 16, and calculate a plurality of verification data according to the factor by using the first algorithm, so as to verify whether a variation of the verification data in the received network packets matches a variation of the verification data calculated thereby.

In detail, FIG. 7 is a flowchart of a network authentication method according to an embodiment of the disclosure. With reference to FIG. 1A and FIG. 7 together, the method of this embodiment is applicable to the network device 14 of FIG. 1A. Detailed steps of the network authentication method of exemplary embodiments of the disclosure accompanied with the elements in the network apparatus 14 will now be described below.

In step S702, the processor 146 of the network apparatus 14 receives a plurality of network packets send by the client end (i.e. the network apparatus 12) through the network 16 by using the network interface device 142.

In step S704, the processor 146 acquires at least one factor related to connection with the network 16.

In step S706, the processor 146 calculates a plurality of verification data according to the at least one factor by using a first algorithm commonly agreed with the client end. The factor acquired and the first algorithm used by the processor 146 are the same as or similar to those used by the processor 126 as described above.

In step S706, the processor 146 sequentially verifies the network packets send by the client end by using the calculated verification data. That is, the processor 146 verifies whether a variation of the plurality of verification data recorded in the plurality of network packets matches a variation of the calculated verification data.

In step S708, the processor 146 establishes the network connection with the client end in response to a variation of the plurality of verification data recorded in the plurality of network packets matching a variation of the calculated verification data.

Based on the above, through verifying the characteristics (i.e. variation) of the sources ports in the sequentially received network packets from the client end, the present method can prevent the communication rules from being known by third parties, and it is possible to identify the client end requesting for the network connection and distinguish the legal client ends from illegal ones before the network connection is established.

To sum up, in the network apparatus and network authentication method thereof of the disclosure, various factors and algorithms are commonly exchanged or agreed by both the client end and the server end and used to calculate one or more verification data serving as the certificate for authentication. Accordingly, through verifying a verification data in the received network packet or a variation of verification data in the sequentially received network packets, the network apparatus can prevent the attackers from arbitrarily establishing a connection to test the network service, so as to improve the security of network communication with limited resources.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A network apparatus, serving as a client end, comprising:

a network interface device configured to connect to a network; and a processor, coupled to the network interface device, and configured to:

acquire a verification data commonly agreed with a server end;

record the verification data in a network packet used for establishing a network connection;

establish the network connection with the server end by transmitting the network packet having the verification data which is verified by the server end, to the server end;

receive services provided by the server end through the network connection;

acquire at least one factor related to connection with the network calculates the verification data according to the at least one factor by using a first algorithm commonly agreed with a server end;

establish the network connection with the server end by using the verification data, wherein the at least one factor comprises one or a combination of a shared key with the server end, time, an internet protocol (IP) address of the server end, the client end, or a gateway, a media access control (MAC) address, a previously used source port, a destination port, a netmask, and a hop count;

negotiate a second algorithm used in a next network connection with the server end; and establish the next network connection with the server end by using at least one verification data calculated by using the second algorithm or using a second verification data negotiated by the server end.

2. The network apparatus according to claim 1, wherein the processor acquires a plurality of verification data commonly agreed with the server end, communicates with the server end by sequentially using the plurality of verification data, and establishes the network connection with the server end after the server end verifies a variation of the plurality of verification data.

3. The network apparatus according to claim 1, wherein the processor negotiates with the server end so as to acquire the verification data.

4. The network apparatus according to claim 3, wherein the processor negotiates at least one second verification data used in a next network connection with the server end and establishes the next network connection with the server end by using the at least one second verification data; or the processor establishes the next network connection with the server end by using a second verification data negotiated by the server end.

5. A network authentication method, adapted for a network apparatus serving as a client end, comprising:

acquiring at least one verification data commonly agreed with the server end;

recording the at least one verification data in a network packet used for establishing a network connection;

establishing or maintaining the network connection with a server end by transmitting the network packet having the at least one verification data which is verified by the server end, to the server end;

receiving services provided by the server end through the network connection;

acquiring at least one factor related to connection with the network, wherein the at least one factor comprises one or a combination of a shared key with the server end, time, an internet protocol (IP) address of the server end, the client end, or a gateway, a media access control (MAC) address, a previously used source port, a destination port, a netmask, and a hop count;

calculating the verification data according to the at least one factor by using a first algorithm commonly agreed with a server end;

establishing the network connection with the server end by using the verification data;

negotiating a second algorithm used in a next network connection with the client end; and establishing the next network connection with the client end in response to a verification data recorded in a next network packet matching the verification data calculated by using the second algorithm.

6. The method according to claim 5, further comprising:

acquiring a plurality of verification data;

communicating with the server end by sequentially using the plurality of verification data; and establishing the network connection with the server end after the server end verifies a variation of the plurality of verification data using the first algorithm.

7. The method according to claim 6, wherein the step of acquiring at least one verification data commonly agreed with the server end comprises:

negotiating with the server end so as to acquire the verification data.

8. A network apparatus, serving as a server end, comprising:

a network interface device configured to connect to a network; and a processor, coupled to the network interface device, and configured to:

receive a network packet send by a client end through the network;

acquire a verification data commonly agreed with the client end; and establish a network connection with the client end in response to a verification data recorded in the network packet matching the acquired verification data, wherein the processor acquires at least one factor related to connection with the network, calculates the verification data according to the at least one factor by using a first algorithm commonly agreed with a client end, verifies a verification data recorded in the network packet by using the calculated verification data, and establishes the network connection with the client end in response to the verification data recorded in the network packet matching the calculated verification data, wherein the at least one factor comprises one or a combination of a shared key with the server end, time, an internet protocol (IP) address of the server end, the client end, or a gateway, a media access control (MAC) address, a previously used source port, a destination port, a netmask, and a hop count.

9. The network apparatus according to claim 8, wherein the processor acquires a plurality of verification data commonly agreed with the client end, sequentially verifies a plurality of network packets send by the client end by using the acquired plurality of verification data, and establishes the network connection with the client end in response to a variation of a plurality of verification data recorded in the plurality of network packets matching a variation of the acquired plurality of verification data.

10. The network apparatus according to claim 8, further comprising:

a storage device, configured to store a block list, wherein the processor adds an identification information of the client end to the block list in response to the verification data recorded in the network packet not matching the acquired verification data.

11. The network apparatus according to claim 10, wherein the processor further determines whether an identification information of the client end which sends the network packet is in the block list, and blocks the client end from establishing the network connection in response to the identification information of the client end being in the block list.

12. The network apparatus according to claim 8, wherein the processor negotiates with the client end so as to acquire the verification data.

13. The network apparatus according to claim 12, wherein the processor negotiates at least one second verification data used in a next network connection with the client end and establishing the next network connection with the client end by using the at least one second verification data.

14. A network authentication method, adapted for a network apparatus serving as a server end, comprising:

receiving a network packet send by a client end through a network;

acquiring at least one verification data commonly agreed with the client end;

establishing a network connection with the client end in response to the verification data recorded in the network packet matching the acquired at least one verification data;

acquiring at least one factor related to connection with the network, wherein the at least one factor comprises one or a combination of a shared key with the server end, time, an internet protocol (IP) address of the server end, the client end, or a gateway, a media access control (MAC) address, a previously used source port, a destination port, a netmask, and a hop count;

calculating the verification data according to the at least one factor by using a first algorithm commonly agreed with a client end;

negotiating a second algorithm used in a next network connection with the client end; and establishing the next network connection with the client end in response to a verification data recorded in a next network packet matching the verification data calculated by using the second algorithm.

15. The method according to claim 14, wherein the step of acquiring at least one verification data commonly agreed with the client end comprises:

negotiating with the client end so as to acquire the verification data.

\* \* \* \* \*